United States Patent
Bennett et al.

(10) Patent No.: US 11,726,257 B2
(45) Date of Patent: Aug. 15, 2023

(54) MULTICORE OPTICAL FIBER

(71) Applicant: CORNING INCORPORATED, Corning, NY (US)

(72) Inventors: Kevin Wallace Bennett, Hammondsport, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/670,941

(22) Filed: Feb. 14, 2022

(65) Prior Publication Data
US 2022/0283362 A1    Sep. 8, 2022

Related U.S. Application Data

(60) Provisional application No. 63/157,006, filed on Mar. 5, 2021.

(30) Foreign Application Priority Data

Mar. 24, 2021   (NL) ..................................... 2027829

(51) Int. Cl.
*G02B 6/02*   (2006.01)
(52) U.S. Cl.
CPC ..... *G02B 6/02042* (2013.01); *G02B 6/02395* (2013.01)
(58) Field of Classification Search
CPC ............ G02B 6/02042; G02B 6/02395; G02B 6/03611; G02B 6/0281
See application file for complete search history.

(56) References Cited

U.S. PATENT DOCUMENTS 8,750,663 B2   6/2014   Tanigawa et al.
8,977,094 B2   3/2015   Oyamada et al.
(Continued)

FOREIGN PATENT DOCUMENTS

| EP | 3885804 A1 | 9/2021 |
|---|---|---|
| WO | 2021/187179 A1 | 9/2021 |
| WO | 2021/189891 A1 | 9/2021 |

OTHER PUBLICATIONS

Clark et al., "Quantifying the Puncture Resistance of Optical Fiber Coatings", In the Proceedings of the 52nd International Wire & Cable Symposium, 2003, pp. 237-245.
(Continued)

*Primary Examiner* — John Bedtelyon
(74) *Attorney, Agent, or Firm* — Kevin L. Bray

(57) ABSTRACT

A multicore optical fiber includes an inner glass region having a plurality of core regions surrounded by a common outer cladding, the inner glass region further having at least one marker and an outer diameter in the range of 120 microns and 130 microns, wherein each core region is comprised of a germania-doped silica core and a fluorine-doped silica trench, wherein the trench volume of the fluorine-doped silica trench is greater than 50% Δ microns². The fiber has an outer coating layer surrounding the inner glass region, the outer coating layer having a primary coating layer and a secondary coating layer with a diameter of the secondary coating layer equal to or less than 200 microns, wherein each core region has a mode field diameter greater than 8.2 microns at 1310 nm, a cable cutoff wavelength of less than 1260 nm, and zero dispersion wavelength of less than 1335 nm.

20 Claims, 10 Drawing Sheets

(56) References Cited

U.S. PATENT DOCUMENTS

| | | |
|---|---|---|
| 9,086,519 B2 | 7/2015 | Arakawa et al. |
| 9,366,807 B2 | 6/2016 | Tanigawa et al. |
| 9,891,378 B2 | 2/2018 | Imamura et al. |
| 9,952,382 B2 | 4/2018 | Hayashi |
| 10,031,285 B2 | 7/2018 | Nakanishi et al. |
| 10,073,217 B2 | 9/2018 | Ishida et al. |
| 10,094,972 B2 | 10/2018 | Sasaki et al. |
| 10,101,526 B2 | 10/2018 | Sasaki et al. |
| 10,139,559 B2 | 11/2018 | Hayashi et al. |
| 10,156,674 B2 | 12/2018 | Takenaga et al. |
| 10,295,736 B2 | 5/2019 | Amma et al. |
| 10,365,429 B2 | 7/2019 | Saito et al. |
| 10,422,946 B2 | 9/2019 | Nakanishi et al. |
| 10,585,234 B2 | 3/2020 | Hasegawa et al. |
| 10,663,653 B2 | 5/2020 | Takenaga et al. |
| 10,690,843 B2 | 6/2020 | Sasaki et al. |
| 10,883,860 B2 | 1/2021 | Ohmori et al. |
| 11,256,026 B2 | 2/2022 | Hayashi |
| 11,531,156 B2 * | 12/2022 | Tandon ................ G02B 6/0365 |
| 2017/0102501 A1 | 4/2017 | Hayashi |
| 2021/0003773 A1 | 1/2021 | Hayashi |
| 2022/0003920 A1 | 1/2022 | Matsui et al. |
| 2022/0066091 A1 | 3/2022 | Hayashi et al. |

OTHER PUBLICATIONS

Jeunhomme, Single Mode Fiber Optics, Marcel Dekker, New York, 1990, pp. 39-44.

\* cited by examiner

MULTICORE OPTICAL FIBER

This Application claims the benefit of priority to Dutch Patent Application No. 2027829 filed on Mar. 24, 2021, which claims priority from U.S. Provisional Patent Application Ser. No. 63/157,006 filed on Mar. 5, 2021, the content of which is relied upon and incorporated herein by reference in its entirety.

BACKGROUND OF THE DISCLOSURE

The present disclosure generally relates to a multicore optical fiber that includes a common cladding and a plurality of core regions having cores which are particularly well-suited for use with optical transmission systems using space division multiplexing (SDM) in telecommunication systems. Multicore optical fibers provide enhanced signal carrying capacity with a single transmission fiber or cable. Multicore optical fibers provide increased fiber density to overcome cable size limitations and duct congestion and are particularly useful for data center applications as well as high speed optical interconnects where there is a desire to increase the fiber density to achieve compact high fiber count connections. It may be desirable to provide for a multicore optical fiber having multiple core regions fit within a desired diameter size that provides low signal cross-talk, low tunneling loss and good bending performance.

SUMMARY OF THE DISCLOSURE

In accordance with one embodiment, a multicore optical fiber is provided. The multicore optical fiber includes an inner glass region having a plurality of core regions surrounded by a common outer cladding, the inner glass region further having at least one marker and an outer diameter in the range of 120 microns and 130 microns, wherein each core region is comprised of a germania-doped silica core and a fluorine-doped silica trench, wherein a trench volume of the fluorine-doped silica trench is greater than 50% $\Delta$ microns$^2$, and an outer coating layer surrounding the inner glass region, wherein the outer coating layer comprises a primary coating layer and a secondary coating layer surrounding the primary coating layer, and wherein a ratio of a secondary coating layer thickness to a primary coating layer thickness is in a range of 0.65 to 1.0, the outer coating layer having a diameter equal to or less than 200 microns, wherein each core region has a mode field diameter greater than 8.2 microns at 1310 nm, a cable cutoff wavelength of less than 1260 nm, and a zero dispersion wavelength of less than 1335 nm.

In accordance with another embodiment, a multicore optical fiber is provided. The multicore optical fiber includes an inner glass region having a plurality of core regions surrounded by a common outer cladding, the inner glass region further having at least one marker and an outer diameter in the range of 120 microns and 130 microns, wherein each core region has an outer radius greater than 11 microns and is comprised of a germania-doped silica core region, an inner cladding and a fluorine-doped silica trench, wherein a trench volume of the fluorine-doped silica trench is greater than 50% $\Delta$ microns$^2$, and an outer coating layer surrounding the inner glass region, wherein the outer coating layer comprises a primary coating layer and a secondary coating layer surrounding the primary coating layer, and wherein a ratio of a secondary coating layer thickness to a primary coating layer thickness is in a range of 0.65 to 1.0, the outer coating layer having a diameter equal to or less than 200 microns, wherein each core region has a mode field diameter greater than 8.2 microns at 1310 nm, a cable cutoff wavelength of less than 1260 nm, and a zero dispersion wavelength of less than 1335 nm.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
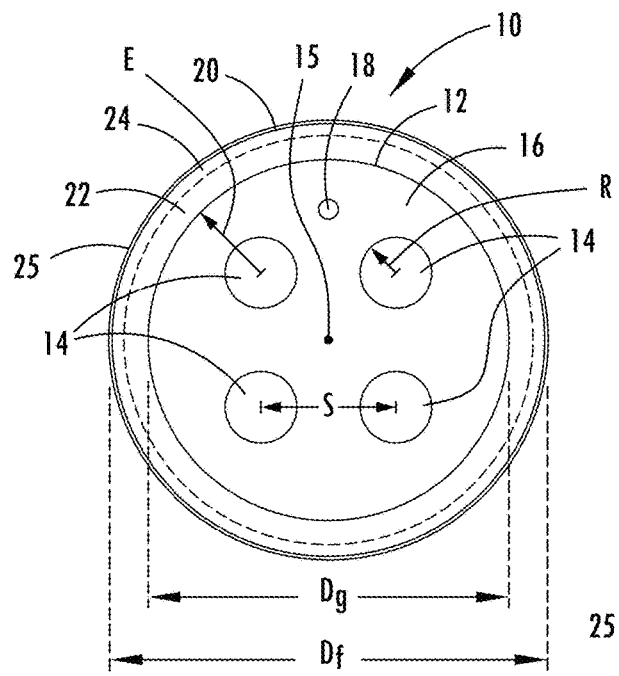
FIG. 1 is an end view of a multicore optical fiber having four core regions and a marker, according to one example.

Reference will now be made in detail to the present preferred embodiments, examples of which are illustrated in the accompanying drawings. Whenever possible, the same reference numerals will be used throughout the drawings to refer to the same or like parts.

The following detailed description represents embodiments that are intended to provide an overview or framework for understanding the nature and character of the claims. The accompanied drawings are included to provide a further understanding of the claims and constitute a part of the specification. The drawings illustrate various embodiments, and together with the descriptions serve to explain the principles and operations of these embodiments as claimed.

"Refractive index" refers to the refractive index at a wavelength of 1550 nm.

The "refractive index profile" is the relationship between refractive index or relative refractive index and waveguide fiber radius. The radius for each region of the refractive index profile is given by the abbreviations $r_1$, $r_2$, $r_3$, $r_4$, etc. and lower and upper case are used interchangeably herein (e.g., $r_1$ is equivalent to $R_1$).

The "relative refractive index percent" is defined as $\Delta\% = 100 \times (n_i^2 - n_c^2)/2n_i^2$, and as used herein $n_i$ is the refractive index of region i of the optical fiber and $n_c$ is the refractive index of undoped silica. As used herein, the relative refractive index is represented by $\Delta$ and its values are given in units of "%", unless otherwise specified. The terms: delta, $\Delta$, $\Delta\%$, % $\Delta$, delta %, % delta and percent delta may be used interchangeably herein. In cases where the refractive index of a region is less than the average refractive index of undoped silica, the relative index percent is negative and is referred to as having a depressed region or depressed index. In cases where the refractive index of a region is greater than the average refractive index of the cladding region, the relative index percent is positive. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. Examples of updopants include $GeO_2$ (germania), $Al_2O_3$, $P_2O_5$, $TiO_2$, Cl, Br. Examples of down dopants include fluorine and boron.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers, the inter-modal dispersion is zero. Zero dispersion wavelength is a wavelength at which the dispersion has a value of zero. Dispersion slope is the rate of change of dispersion with respect to wavelength.

"Effective area" is defined as:

$$A_{\mathit{eff}} = \frac{2\pi \left[\int_0^\infty (f(r))^2 r \, dr\right]^2}{\int_0^\infty (f(r))^4 r \, dr}$$

where f(r) is the transverse component of the electric field associated with light propagated in the waveguide. As used herein, "effective area" or "$A_{\mathit{eff}}$" refers to optical effective area at a wavelength of 1550 nm unless otherwise noted.

The trench volume V3 is defined for a depressed index region $$V_3 = |2 \int_{r_{\mathit{Trench,inner}}}^{r_{\mathit{Trench,outer}}} (\Delta_{\mathit{Trench}}(r) - \Delta_c) r \, dr|$$

where $r_{\mathit{Trench,inner}}$ is the inner radius of the trench cladding region, $r_{\mathit{Trench,outer}}$ is the outer radius of the trench cladding region, $\Delta_{\mathit{Trench}}(r)$ is the relative refractive index of the trench cladding region, and $\Delta_c$ is the average relative refractive index of the common outer cladding region of the glass fiber. In embodiments in which a trench is directly adjacent to the core, $r_{\mathit{Trench,inner}}$ is $r_2 = r_1$ (outer radius of the core), $r_{\mathit{Trench,outer}}$ is $r_3$, and $\Delta_{\mathit{Trench}}$ is $\Delta_3(r)$. In embodiments in which a trench is directly adjacent to an inner cladding region, $r_{\mathit{Trench,inner}}$ is $r_2 > r_1$, $r_{\mathit{Trench,outer}}$ is $r_3$ and $\Delta_{\mathit{Trench}}$ is $\Delta_3(r)$. Trench volume is defined as an absolute value and has a positive value. Trench volume is expressed herein in units of %-$\Delta$-micron$^2$, % $\Delta$-$\mu m^2$, or %-micron$^2$, %-$\mu m^2$, whereby these units can be used interchangeably.

The term "$\alpha$-profile" refers to a relative refractive index profile, expressed in terms of $\Delta(r)$ which is in units of "%", where r is radius, which follows the equation, $$\Delta(r) = \Delta(r_0)\left[1 - \left[\frac{|r - r_0|}{(r_1 - r_0)}\right]^\alpha\right]$$

where $r_o$ is the point at which $\Delta(r)$ is maximum, $r_1$ is the point at which $\Delta(r)$ % is zero, and r is in the range $r_i \leq r \leq r_f$, where $\Delta$ is defined above, $r_i$ is the initial point of the $\alpha$-profile, $r_f$ is the final point of the $\alpha$-profile, and $\alpha$ is an exponent which is a real number.

The mode field diameter (MFD) is measured using the Peterman II method wherein, $$MFD = 2w$$

$$w^2 = 2 \frac{\int_0^\infty (f(r))^2 r \, dr}{\int_0^\infty \left(\frac{df(r)}{dr}\right)^2 r \, dr}$$

Mode field diameter depends on the wavelength of the optical signal in the optical fiber. Specific indication of the wavelength will be made when referring to mode field diameter herein. Unless otherwise specified, mode field diameter refers to the $LP_{01}$ mode at the specified wavelength.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

Fiber cutoff is measured by the standard 2 m (2 meter) fiber cutoff test, FOTP-80 (ETA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

By cabled cutoff wavelength, or "cabled cutoff" as used herein, we mean the 22 m (22 meter) cabled cutoff test described in the EIA-445 Fiber Optic Test Procedures, which are part of the EIA-TIA Fiber Optics Standards, that is, the Electronics Industry Alliance—Telecommunications Industry Association Fiber Optics Standards.

Unless otherwise noted herein, optical properties (such as dispersion, dispersion slope, etc.) are reported for the LP01 mode.

Figure 2:
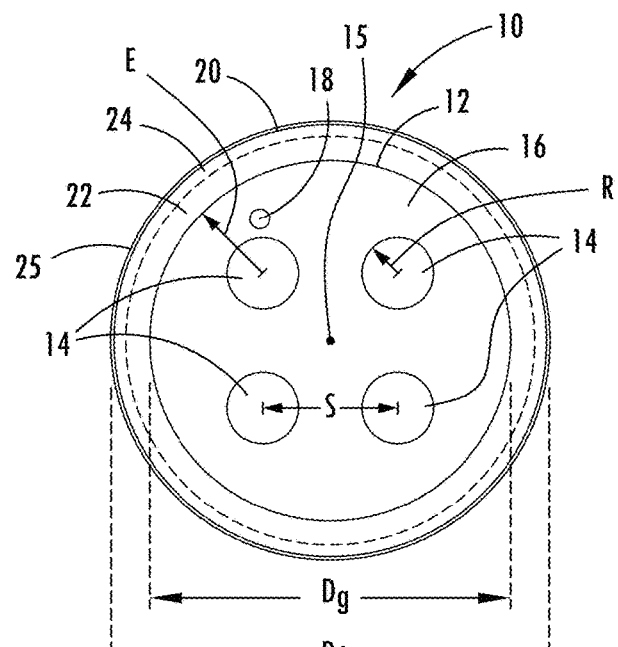
FIG. 2 is an end view of a multicore optical fiber having four core regions and a marker, according to another example.

Referring to FIGS. 1 and 2, the terminal end of multicore optical fibers 10 having an inner glass region 12 containing a plurality of core regions 14 surrounded by a common outer cladding 16 and an outer coating layer 20 are illustrated, according to various examples. The plurality of core regions 14 each define a core-portion of inner glass region 12 and may be glass core regions each having a circular shape in cross-section and spaced apart from one another. Each core region 14 includes a core, an inner cladding surrounding the core and a trench. This allows the trench to be offset from the core and allows for a large trench volume. In some embodiments, the inner cladding may be omitted such that the trench is adjacent to the core. The common outer cladding 16 is shown having a generally circular end shape or cross-sectional shape in the embodiments illustrated. The plurality of core regions 14 each extend in a cylindrical shape through the length of the multicore optical fiber 10 and are illustrated spaced apart from one another and are surrounded and separated by the common outer cladding 16. The multicore optical fiber 10 contains at least two core regions 14, preferably at least three core regions 14, and more particularly at least four core regions 14, and therefore has a plurality of core regions 14. It should be appreciated that two or more core regions 14 may be included in the multicore optical fiber 10 in various numbers of core regions and various fiber arrangements.

The multicore optical fiber 10 employs a plurality of glass core regions 14 spaced from one another and surrounded by the common outer cladding 16. The core regions 14 and common outer cladding 16 may be made of glass or other optical fiber material and may be doped suitable for optical fiber. In one embodiment, each core region 14 is comprised of germania-doped silica core, an inner cladding and a fluorine-doped silica trench. In one embodiment, the shape of the multicore optical fiber 10 may be a circular end shape or circular cross-sectional shape as shown in FIGS. 1 and 2. According to other embodiments, end and cross-sectional shapes and sizes may be employed including elliptical, hexagonal and various polygonal forms. The multicore optical fiber 10 includes a plurality of core regions 14, each capable of communicating light signals between transceivers including transmitters and receivers which may allow for parallel processing of multiple signals. The multicore optical fiber 10 may be used for wavelength division multiplexing (WDM) or multi-level logic or for other parallel optics of spatial division multiplexing. The multicore optical fiber 10 may advantageously be aligned with and connected to various devices in a manner that allows for easy and reliable connection so that the plurality of core regions 14 are aligned accurately at opposite terminal ends with like communication paths in connecting devices.

The multicore optical fiber 10 illustrated in FIG. 1 has an inner glass region 12 having four (4) circular-shaped core regions 14 arranged in a 2×2 array and surrounded by a common outer cladding 16. Each of the circular-shaped core regions 14 has an outer radius R greater than 11 microns, and the outer radius R may be greater than 13 microns, where the outer radius R of each core region 14 is measured with respect to its center as shown in FIGS. 1 and 2. The outer radius R may have an upper limit of 20 microns. Adjacent core regions 14 are spaced apart from each other by a separation distance S, which is defined as a distance between the centers of adjacent core regions 14. Separation distance S between centers of adjacent core regions 14 may be greater than 35 microns and may be greater than 40 microns, according to various embodiments. Separation distance S may be less than 48 microns which may correspond to a core center to fiber edge distance of 28 microns in one example, or may be less than 46 microns which may correspond to a core center to fiber edge distance of 30 microns in another example. The common outer cladding 16 is also shown having an outer circular shape defining the shape of the inner glass region 12 with a glass diameter $D_g$. In an embodiment, the glass diameter $D_g$ is between 120 microns and 130 microns.

In the embodiments shown in FIGS. 1 and 2, the multicore optical fiber 10 has an inner glass region 12 having the core regions 14 arranged in a 2×2 array and centered within and about the center of inner glass region 12. As such, the core regions 14 are spaced apart and centered within the inner glass region 12 such that they are symmetric about and evenly spaced from a center 15 of inner glass region 12. In FIG. 1, the inner glass region 12 includes a marker 18. It should be appreciated that one or more markers may be employed to assist with identifying the alignment of the core regions 14. The marker 18 is shown located at a symmetric position with respect to a pair of the core regions 14 in FIG. 1, and is shown located adjacent to or closer to one core region 14 in FIG. 2 to mark that particular core region. The marker 18 may be employed to determine the alignment of the core regions 14 for interconnection with other fibers or connection devices. The marker 18 may be made of a fluorine-doped glass having a refractive index that is lower than that of silica.

The multicore optical fiber 10 includes an outer coating layer 20 which surrounds and encapsulates the inner glass region 12. The outer coating layer 20 is shown in FIGS. 1 and 2 as having a primary or inner coating layer 22 that immediately surrounds the inner glass region 12 and a secondary or outer coating layer 24 that immediately surrounds the primary coating layer 22. The coating layer 20 may further include a tertiary layer 25 (e.g., ink layer) optionally surrounding or directly adjacent to the secondary coating layer 24.

The coating layer 20 has a ratio of the thickness of the secondary coating layer 24 to the thickness of the primary coating layer in the range of 0.65 to 1.0, according to one embodiment. According to other embodiments, the ratio of the secondary coating layer thickness to the primary coating layer thickness may be in the range of 0.70 to 0.95, more particularly in the range of 0.75 to 0.90, and more particularly in the range of 0.75 to 0.85. The ratio of the secondary coating layer thickness to the primary coating layer thickness within the range of 0.65 to 1.0 and the reduced thickness coating layer 20 advantageously aids in a desirable goal in reducing signal cross-talk between core regions 14 in the multicore optical fiber 10 and leakage of signal from the fiber cores to the outside of the multicore optical fiber 10.

The primary coating layer 22 may be made of a known primary coating composition. For example, the primary coating composition may have a formulation listed below in Table 1 which is typical of commercially available primary coating composition.

TABLE 1

Primary Coating Composition

| Component | Amount |
| --- | --- |
| Oligomeric Material | 50.0 wt % |
| SR504 | 46.5 wt % |
| NVC | 2.0 wt % |
| TPO | 1.5 wt % |
| Irganox 1035 | 1.0 pph |
| 3-Acryloxypropyl trimethoxysilane | 0.8 pph |
| Pentaerythritol tetrakis(3-mercaptopropionate) | 0.032 pph | where the oligomeric material may be prepared from H12MDI, HEA, and PPG4000 using a molar ratio n:m:p=3.5:3.0:2.0, H12MDI is 4,4'-methylenebis(cyclohexyl isocyanate) (available from Millipore Sigma), HEA is 2-hydroxyethylacrylate (available from Millipore Sigma), PPG4000 is polypropylene glycol with a number average molecular weight of about 4000 g/mol (available from Covestro), SR504 is ethoxylated (4)nonylphenol acrylate (available from Sartomer), NVC is N-vinylcaprolactam (available from Aldrich), TPO (a photoinitiator) is (2,4,6-trimethylbenzoyl)-diphenyl phosphine oxide (available from BASF), Irganox 1035 (an antioxidant) is benzenepropanoic acid, 3,5-bis(1,1-dimethylethyl)-4-hydroxythiodi-2,1-ethanediyl ester (available from BASF), 3-acryloxypropyl trimethoxysilane is an adhesion promoter (available from Gelest), and pentaerythritol tetrakis(3-mercaptopropionate) (also known as tetrathiol, available from Aldrich) is a chain transfer agent. The concentration unit "pph" refers to an amount relative to a base composition that includes all monomers, oligomers, and photoinitiators. For example, a concentration of 1.0 pph for Irganox 1035 corresponds to 1 g Irganox 1035 per 100 g combined of oligomeric material, SR504, NVC, and TPO.

The secondary coating layer 24 may be made of a known secondary coating composition. The secondary coating may be prepared from a composition that exhibits high Young's modulus. Higher values of Young's modulus may represent improvements that make the secondary coating prepared for the coating composition better suited for small diameter optical fibers. More specifically, the higher values of Young's modulus enable use of thinner secondary coatings on optical fibers without sacrificing performance. Thinner secondary coatings reduce the overall diameter of the optical fiber and provide higher fiber counts in cables of a given cross-sectional area. The Young's modulus of secondary coatings prepared as the secondary coating composition may be equal to or greater than 1500 MPa, more particularly about 1800 MPa or greater, or about 2100 MPa or greater and about 2800 MPa or less or about 2600 MPa or less. The results of tensile property measurements prepared from various curable secondary compositions are listed below in Table 2.

TABLE 2

Tensile Properties of Secondary Coatings

| Composition | Young's Modulus (MPa) |
| --- | --- |
| KB | 1703 |
| A | 2049 |
| SB | 2532 |

Secondary Coating Compositions. Representative in curable secondary coating compositions are listed below in Table 3.

TABLE 3

Secondary Coating Compositions

| Component | Composition KB |
| --- | --- |
| SR601 (wt %) | 30.0 |
| SR602 (wt %) | 37.0 |
| SR349 (wt %) | 30.0 |
| Irgacure 1850 (wt %) | 3.0 |

SR601 is ethoxylated (4) bisphenol A diacrylate (a monomer). SR602 is ethoxylated (10) bisphenol A diacrylate (a monomer). SR349 is ethoxylated (2) bisphenol A diacrylate (a monomer). Irgacure 1850 is bis(2,6-dimethoxybenzoyl)-2,4,4-trimethylpentylphosphine oxide (a photoinitiator).

A comparative curable secondary coating composition (A) and a representative curable secondary coating composition SB within the scope of the disclosure are listed in Table 4.

TABLE 4

Secondary Coating Compositions

| | Composition | |
| --- | --- | --- |
| Component | A | SB |
| PE210 (wt %) | 15.0 | 15.0 |
| M240 (wt %) | 72.0 | 72.0 |
| M2300 (wt %) | 10.0 | — |
| M3130 (wt %) | — | 10.0 |
| TPO (wt %) | 1.5 | 1.5 |
| Irgacure 184 (wt %) | 1.5 | 1.5 |
| Irganox 1035 (pph) | 0.5 | 0.5 |
| DC-190 (pph) | 1.0 | 1.0 |

PE210 is bisphenol-A epoxy diacrylate (available from Miwon Specialty Chemical, Korea), M240 is ethoxylated (4) bisphenol-A diacrylate (available from Miwon Specialty Chemical, Korea), M2300 is ethoxylated (30) bisphenol-A diacrylate (available from Miwon Specialty Chemical, Korea), M3130 is ethoxylated (3) trimethylolpropane triacrylate (available from Miwon Specialty Chemical, Korea), TPO (a photoinitiator) is (2,4,6-trimethylbenzoyl)diphenyl phosphine oxide (available from BASF), Irgacure 184 (a photoinitiator) is 1-hydroxycyclohexyl-phenyl ketone (available from BASF), Irganox 1035 (an antioxidant) is benzenepropanoic acid, 3,5-bis(1,1-dimethylethyl)-4-hydroxythiodi-2,1-ethanediyl ester (available from BASF). DC190 (a slip agent) is silicone-ethylene oxide/propylene oxide copolymer (available from Dow Chemical). The concentration unit "pph" refers to an amount relative to a base composition that includes all monomers and photoinitiators. For example, for secondary coating composition A, a concentration of 1.0 pph for DC-190 corresponds to 1 g DC-190 per 100 g combined of PE210, M240, M2300, TPO, and Irgacure 184.

Secondary Coating—Properties. The Young's modulus, tensile strength at break, and elongation at break of secondary coatings made from secondary compositions A, KB and SB were measured.

Secondary Coating—Properties—Measurement Techniques. Properties of secondary coatings were determined using the measurement techniques described below.

Tensile Properties. The curable secondary coating compositions were cured and configured in the form of cured rod samples for measurement of Young's modulus, tensile strength at yield, yield strength, and elongation at yield. The cured rods were prepared by injecting the curable secondary composition into Teflon® tubing having an inner diameter of about 0.025". The rod samples were cured using a Fusion D bulb at a dose of about 2.4 J/cm2 (measured over a wavelength range of 225-424 nm by a Light Bug model IL390 from International Light). After curing, the Teflon® tubing was stripped away to provide a cured rod sample of the secondary coating composition. The cured rods were allowed to condition for 18-24 hours at 23° C. and 50% relative humidity before testing. Young's modulus, tensile strength at break, yield strength, and elongation at yield were measured using a Sintech MTS Tensile Tester on defect-free rod samples with a gauge length of 51 mm, and a test speed of 250 mm/min. Tensile properties were measured according to ASTM Standard D882-97. The properties were determined as an average of at least five samples, with defective samples being excluded from the average.

The results show that secondary coatings prepared from compositions SB, SC, and SD exhibited higher Young's modulus than the secondary coating prepared from comparative composition A. Secondary coatings with high Young's modulus as disclosed herein may be better suited for small diameter optical fibers. More specifically, a higher Young's modulus enables use of thinner secondary coatings on optical fibers, thereby enabling smaller fiber diameters without sacrificing performance. Thinner secondary coatings reduce the overall diameter of the optical fiber and provide higher fiber counts in cables of a given cross-sectional area.

The primary coating layer 22 may have a Young's modulus of less than 1 MPa and a $T_g$ (glass transition temperature) of less than −20° C., and the secondary coating layer 24 may have a Young's modulus of greater than 1500 MPa and a $T_g$ of greater than 65° C.

The inner glass region 12 has an overall cross-sectional diameter $D_g$ which may be in the range of 120-130 microns, according to one example. The outer coating layer 20 may have a thickness in the range of 22-45 microns, or in the range of 22-40 microns, or in the range from 22-35 microns. The primary coating layer 22 may have a thickness in the range of 12-25 microns, or in the range from 12-22 microns, or in the range from 12-19 microns. The secondary coating layer 24 may have a thickness in the range of 10-20 microns, or in the range from 10-18 microns, or in the range from 10-16 microns. The optional tertiary coating layer 25 may have a thickness equal to or less than 10 microns, more particularly equal to or less than 5 microns, and more particularly in the range of 2-5 microns. The coated multicore optical fiber 10 has an overall fiber diameter $D_f$ equal to or less than 200 microns. More specifically, the overall diameter $D_f$ may be in the range of 160-200 microns, or in the range of 160-190 microns, or in the range of 180-200 microns.

Each core region 14 may be formed of germania-doped silica or other suitable glass and may have a fluorine-doped silica trench, wherein the trench volume of the fluorine-doped silica trench is greater than 50% Δ microns$^2$. The common outer cladding 16 may be made of silica or fluorine-doped silica or other suitable glass. It should be appreciated that the inner glass region 12 may be formed from a preform drawn at an elevated temperature (e.g., temperature of about 2000° C.) in a furnace. The outer coating layer 20, including one or more of the primary coating layer 22, secondary coating layer 24 and tertiary coating layer 25, may be applied after the uncoated optical fiber exits the furnace and is cooled.

Figure 3:
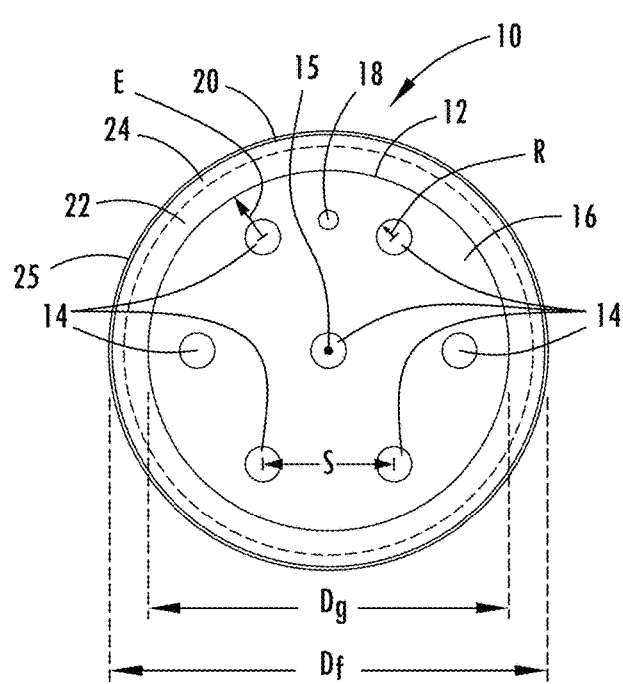
FIG. 3 is an end view of a multicore optical fiber having seven core regions and a marker, according to a further example.

The multicore optical fiber 10 shown in FIG. 3 includes seven (7) core regions 14 including a central core region 14 at the center of the multicore optical fiber 10 and six (6) evenly spaced core regions 14 generally circularly-spaced an equal distance from the central core region 14. A marker 18 is shown located in a symmetric position between two core regions 14. The marker 18 may have a diameter in the range of 5 to 13 microns, move particularly in the range of 6 to 12 microns, and more particularly in the range of 7 to 10 microns. In this embodiment, the core regions 14 may each have a radius R in the range of 11-14 microns, for example, which may be smaller than the radius of the four core region having a radius R of about 16 microns in the examples shown in FIGS. 1 and 2. The multicore optical fiber 10 is thereby able to include a larger number of core regions 14 within a multicore optical fiber 10 having an overall diameter $D_f$ equal to or less than 200 microns. It should be appreciated that the multicore optical fiber 10 may include more or less core regions 14 according to other examples. In one example, the number of core regions 14 may be in the range of 3-8. By employing a thin outer coating layer 20, a greater number of core regions 14 may be employed. By employing a trench within each of the core regions 14, signal cross-talk and signal interference between core regions 14 advantageously may be sufficiently prevented.

Each core region 14 has a trench-assisted refractive index design profile having a mode field diameter of greater than 8.2 microns at a wavelength of 1310 nm, a cable or fiber cut-off wavelength of less than 1260 nm, and zero dispersion wavelength of less than 1340 nm. The trench volume of the trench in each core region 14 is greater than 50% Δ microns$^2$ and less than 90% Δ microns$^2$. The signal cross-talk at 1310 nm per 100 km is less than −30 dB, and more preferably less than −40 dB, and even more preferably less than −50 dB.

In one aspect, the outer cladding $OC_i$ can be characterized by a trench volume of greater than about 30% Δ-square micrometers. In one aspect, the outer cladding $OC_i$ can have a trench volume of greater than about 30% Δ-square micrometers, greater than about 40% Δ-square micrometers, greater than about 50% Δ-square micrometers, or greater than about 60% Δ-square micrometers. In some aspects, the outer cladding $OC_i$ can have a trench volume of less than about 75% Δ-square micrometers, less than about 70% Δ-square micrometers, less than about 65% Δ-square micrometers, or less than about 60% Δ-square micrometers. In some aspects, the outer cladding $OC_i$ can have a trench volume of from about 30% Δ-square micrometers to about 75% Δ-square micrometers, about 40% Δ-square micrometers to about 75% Δ-square micrometers, about 50% Δ-square micrometers to about 75% Δ-square micrometers, about 60% Δ-square micrometers to about 75% Δ-square micrometers, about 30% Δ-square micrometers to about 65% Δ-square micrometers, about 40% Δ-square micrometers to about 65% Δ-square micrometers, about 50% Δ-square micrometers to about 65% Δ-square micrometers, about 30% Δ-square micrometers to about 55% Δ-square micrometers, or about 40% Δ-square micrometers to about 55% Δ-square micrometers. For example, the outer cladding $OC_i$ can have a trench volume of about 30% Δ-square micrometers, about 40% Δ-square micrometers, about 45% Δ-square micrometers, about 46% Δ-square micrometers, about 47% Δ-square micrometers, about 48% Δ-square micrometers, about 49% Δ-square micrometers, about 50% Δ-square micrometers, about 55% Δ-square micrometers, about 60% Δ-square micrometers, about 61% Δ-square micrometers, about 62% Δ-square micrometers, about 68% Δ-square micrometers, about 69% Δ-square micrometers, about 70% Δ-square micrometers, about 75% Δ-square micrometers, or any trench volume between these values. Each outer cladding $OC_i$ can have the same or different trench volume. The trench volume of the outer cladding $OC_i$ can be determined as described above.

The multicore optical fiber 10 can be characterized by crosstalk between adjacent cores $C_i$ of equal to or less than −20 dB, as measured for a 100 km length of the multicore optical fiber 10 operating at 1550 nm. In some aspects, the multicore optical fiber 10 can be characterized by crosstalk between adjacent cores $C_i$ of equal to or less than −30 dB, as measured for a 100 km length of the multicore optical fiber 10. In some aspects, crosstalk between adjacent cores $C_i$ is ≤−20 dB, ≤−30 dB, ≤−40 dB, ≤−50 dB, or ≤−60 dB, as measured for a 100 km length of the multicore optical fiber 10 operating at 1550 nm. The crosstalk can be determined based on the coupling coefficient, which depends on the design of the core and a distance between two adjacent cores, and Δβ, which depends on a difference in β values between the two adjacent cores. For two cores placed next to each other, assuming the power launched into the first core is $P_1$, using coupled mode theory and considering the perturbations along the fiber, the power coupled to the second core, $P_2$, can be determined using the following equation:

$$P_2 = \frac{L}{L_c} \left\langle \left(\frac{\kappa}{g}\right)^2 \sin^2(g\Delta L) \right\rangle P_1$$

where < > denotes the average, L is fiber length, κ is the coupling coefficient, ΔL is the length of the fiber segment over which the fiber is uniform, $L_c$ is the correlation length, and g is given by the following equation:

$$g^2 = \kappa^2 + \left(\frac{\Delta\beta}{2}\right)^2$$

where Δβ is the mismatch in propagation constant between the modes in two cores when they are isolated. The crosstalk (in dB) can be determined using the following equation:

$$X = 10\log\left(\frac{P_2}{P_1}\right) = 10\log\left(\frac{L}{L_c}\left\langle\left(\frac{\kappa}{g}\right)^2 \sin^2(g\Delta L)\right\rangle\right)$$

The crosstalk between the two cores grows linearly in the linear scale, but does not grow linearly in the dB scale. As used herein, crosstalk performance is reported for a 100 km length of optical fiber. However, crosstalk performance can also be represented with respect to alternative optical fiber lengths, with appropriate scaling. For optical fiber lengths other than 100 km, the crosstalk between cores can be determined using the following equation:

$$X(L) = X(100) + 10\log\left(\frac{L}{100}\right)$$

For example, for a 10 km length of optical fiber, the crosstalk can be determined by adding "−10 dB" to the crosstalk value for a 100 km length optical fiber. For a 1 km length of optical fiber, the crosstalk can be determined by adding "−20 dB" to the crosstalk value for a 100 km length of optical fiber.

In some embodiments, the core-to-core separation distance S is greater than 35 microns. In other embodiments, the core-to-core separation distance S is greater than 40 microns. In still further embodiments, the core-to-core separation distance S is greater than 45 microns.

In some embodiments, the minimum core region edge to fiber edge distance E (FIGS. 1 and 2) is greater than 25 microns, where the distance E is measured from the center of the core region 14 to the closest point on the outside edge of the inner glass region 12. In other embodiments, the minimum core region edge to fiber edge distance E is greater than 30 microns.

In some embodiments, the outer trench radius is between 11 microns and 20 microns. In other embodiments, the outer trench radius is between 12 microns and 18 microns. The fiber 10 has an overall diameter $D_f$ measured across the fiber coating of less than 200 microns. In some embodiments, the coating layer outer diameter $D_f$ is less than 190 microns. In yet other embodiments, the coating layer outer diameter $D_f$ is less than 180 microns.

The coating layer 20 which is comprised of the primary coating layer 22, secondary coating layer 24 and an optional tertiary layer 25 provides a puncture resistant coating for the multicore optical fiber 10. The primary coating layer 22 may have an elastic modulus of less than 1 MPa and Tg (glass transition temperature) of less than −40° C. The secondary coating layer 24 may have a Young's modulus of greater 1500 MPa and Tg of greater than 65° C. In some embodiments, the puncture resistance of the fiber 10 is greater than 20 g, and in other embodiment, the puncture resistance of the fiber 10 is greater than 25 g.

Figure 12:
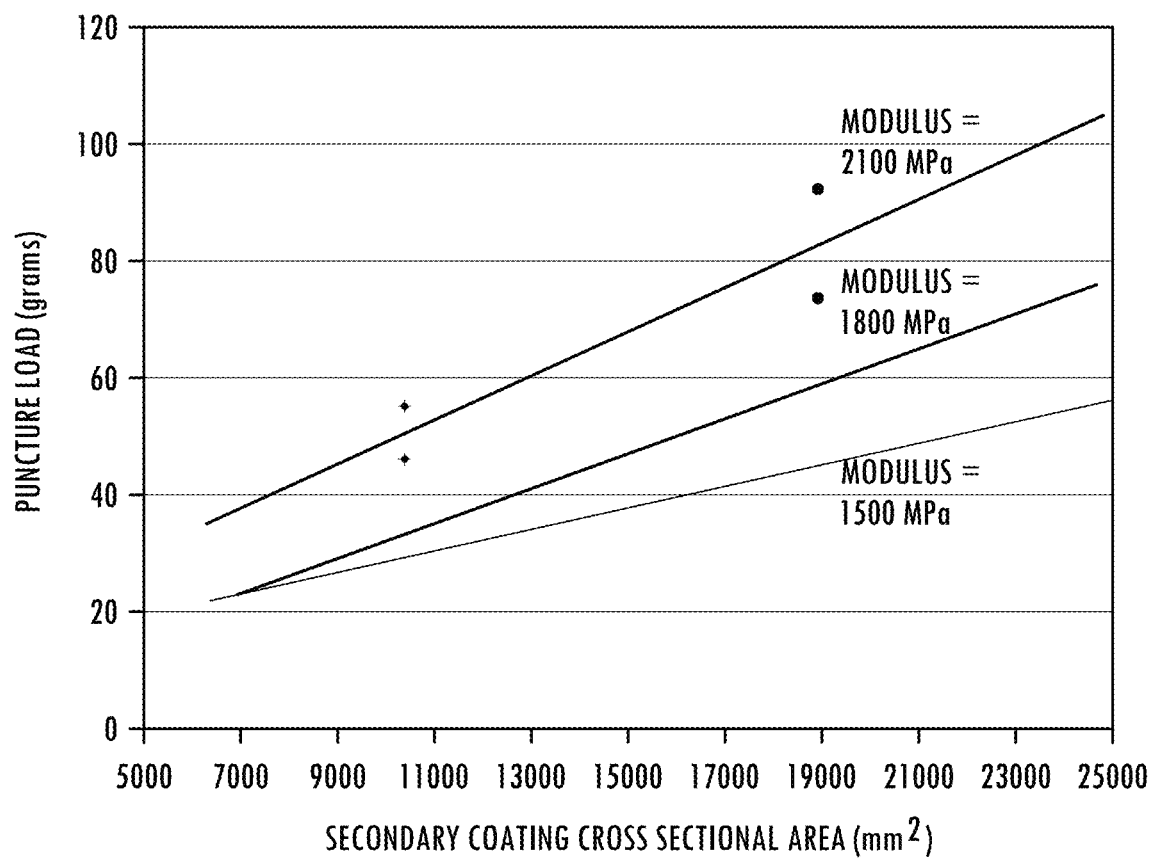
FIG. 12 is a graph illustrating the puncture resistance of a multicore optical fiber for a secondary coating with different elastic moduli.

The puncture resistance of secondary coatings suitable for the multicore optical fiber 10 for different combinations of secondary coating cross-section area and elastic modulus is shown in FIG. 12. The cross-sectional area of the secondary coating layer corresponds to the area defined by the thickness of the secondary coating layer; that is, the area between an inner radius of the secondary coating layer and an outer radius of the secondary coating layer. Considering ratio of secondary coating layer thickness to primary coating layer thickness to be 0.8, one gets secondary coating layer area of 7966 micron for a fiber coating diameter of 200 microns and 9599 microns for a fiber coating diameter of 200 microns. As seen, the secondary coating layer for use with multicore optical fiber 10 exhibits enhanced puncture resistance with increasing modulus of the secondary coating layer. The puncture resistance of the secondary coating layer is expressed herein in terms of a puncture load. Puncture load is determined by . . . (explain test procedure). The puncture load of the secondary coating layer of multicore optical fiber 10 may be greater than 20 g, and more particularly may be greater than 25 g or greater than 30 g, or greater than 35 g or greater than 40 g for the thicknesses of the secondary coating layer disclosed herein.

Puncture Resistance of Secondary Coating. Puncture resistance measurements were made on samples that included a glass fiber, a primary coating, and a secondary coating. The glass fiber had a diameter of 125 μm. The primary coating was formed from the reference primary coating composition listed in Table 8 below. Samples with various secondary coatings were prepared as described below. The thicknesses of the primary coating and secondary coating were adjusted to vary the cross-sectional area of the secondary coating as described below. The ratio of the thickness of the secondary coating to the thickness of the primary coating was maintained at about 0.8 for all samples.

The puncture resistance was measured using the technique described in the article entitled "Quantifying the Puncture Resistance of Optical Fiber Coatings", by G. Scott Glaesemann and Donald A. Clark, published in the Proceedings of the 52$^{nd}$ International Wire & Cable Symposium, pp. 237-245 (2003). A summary of the method is provided here. The method is an indentation method. A 4-centimeter length of optical fiber was placed on a 3 mm-thick glass slide. One end of the optical fiber was attached to a device that permitted rotation of the optical fiber in a controlled fashion. The optical fiber was examined in transmission under 100× magnification and rotated until the secondary coating thickness was equivalent on both sides of the glass fiber in a direction parallel to the glass slide. In this position, the thickness of the secondary coating was equal on both sides of the optical fiber in a direction parallel to the glass slide. The thickness of the secondary coating in the directions normal to the glass slide and above or below the glass fiber differed from the thickness of the secondary coating in the direction parallel to the glass slide. One of the thicknesses in the direction normal to the glass slide was greater and the other of the thicknesses in the direction normal to the glass slide was less than the thickness in the direction parallel to the glass slide. This position of the optical fiber was fixed by taping the optical fiber to the glass slide at both ends and is the position of the optical fiber used for the indentation test.

Indentation was carried out using a universal testing machine (Instron model 5500R or equivalent). An inverted microscope was placed beneath the crosshead of the testing machine. The objective of the microscope was positioned directly beneath a 75° diamond wedge indenter that was installed in the testing machine. The glass slide with taped fiber was placed on the microscope stage and positioned directly beneath the indenter such that the width of the indenter wedge was orthogonal to the direction of the optical fiber. With the optical fiber in place, the diamond wedge was lowered until it contacted the surface of the secondary coating. The diamond wedge was then driven into the secondary coating at a rate of 0.1 mm/min and the load on the secondary coating was measured. The load on the secondary coating increased as the diamond wedge was driven deeper into the secondary coating until puncture occurred, at which point a precipitous decrease in load was observed. The indentation load at which puncture was observed was recorded and is reported herein as grams of force. The experiment was repeated with the optical fiber in the same orientation to obtain ten measurement points, which were averaged to determine a puncture resistance for the orientation. A second set of ten measurement points was taken by rotating the orientation of the optical fiber by 180°.

Several fiber samples with each of the three secondary coating layers are shown. Each fiber sample included a glass fiber with a diameter of 125 μm, a primary coating layer formed from the example primary coating composition disclosed herein, and one of three secondary coating layers with different cross-section areas and elastic modulus. The thicknesses of the primary coating layer and secondary coating layer were adjusted to vary the cross-sectional area of the secondary coating layer as shown in FIG. 12. The ratio of the thickness of the secondary coating layer to the thickness of the primary coating layer was maintained at about 0.8 for all samples.

Fiber samples with a range of thicknesses were prepared for each of the secondary coating layers to determine the dependence of puncture load on the thickness of the secondary coating. One strategy for achieving higher fiber count in cables is to reduce the thickness of the secondary coating layer. As the thickness of the secondary coating layer is decreased, however, its performance diminishes and its protective function is compromised. Puncture resistance is a measure of the protective function of a secondary coating layer. A secondary coating layer with a high puncture resistance withstands greater impact without failing and provides better protection for the inner glass region 12 of the multicore optical fiber 10.

The puncture load as a function of cross-sectional area for the three coatings is shown in FIG. 12. Cross-sectional area is selected as a parameter for reporting puncture load because an approximately linear correlation of puncture load with cross-sectional area of the secondary coating was observed. The three traces show the approximate linear dependence of puncture load on cross-sectional area for the secondary coating.

The higher modulus traces show an improvement in puncture load for high cross-sectional areas. The improvement, however, diminishes as the cross-sectional area decreases. At a cross-sectional area of 7000 μm$^2$, for example, the puncture load of the secondary coating layer obtained from secondary coating layer having a modulus of 1800 MPa becomes approximately equal to the puncture load of the secondary coating layer having a modulus of 1500 MPa and the increase in puncture load of the secondary coating layer with a modulus of 2100 MPa relative to the secondary coating layers having moduli of 1800 MPa and 1500 MPa becomes smaller than the increase observed at higher cross-sectional areas.

The puncture load of a secondary coating layer having a Young's modulus of at least 1500 MPa at a cross-sectional area of about 7000 μm$^2$ is greater than 20 g. The puncture load of a secondary coating layer having a Young's modulus of at least 1500 MPa at a cross-sectional area of about 10000 μm$^2$ is greater than 25 g. The puncture load of a secondary coating layer having a Young's modulus of at least 1500 MPa at a cross-sectional area of 15000 μm$^2$ is greater than 35 g. The puncture load of a secondary coating layer having a Young's modulus of at least 1500 MPa at a cross-sectional area of 20000 μm$^2$ is greater than 45 g. The puncture load of a secondary coating layer having a Young's modulus of 2100 MPa is greater than 35 g for a cross-sectional area of 7000 μm$^2$ and greater. Embodiments include secondary coatings having any combination of the foregoing puncture loads.

Example 1

Figure 4:
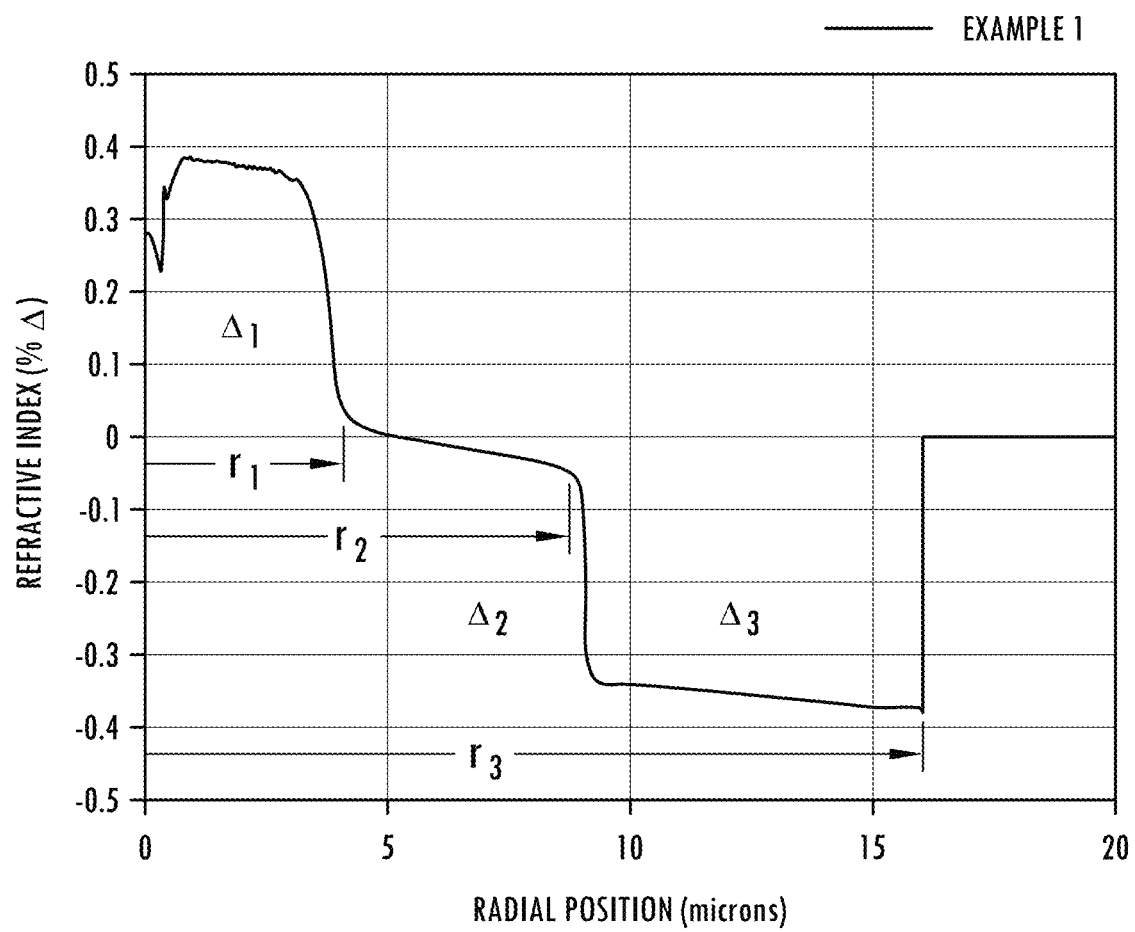
FIG. 4 is a graph illustrating the refractive index design profile of each of the core regions of the multicore optical fiber having four core regions as shown in FIGS. 1 and 2, according to Example 1.
Figure 5:
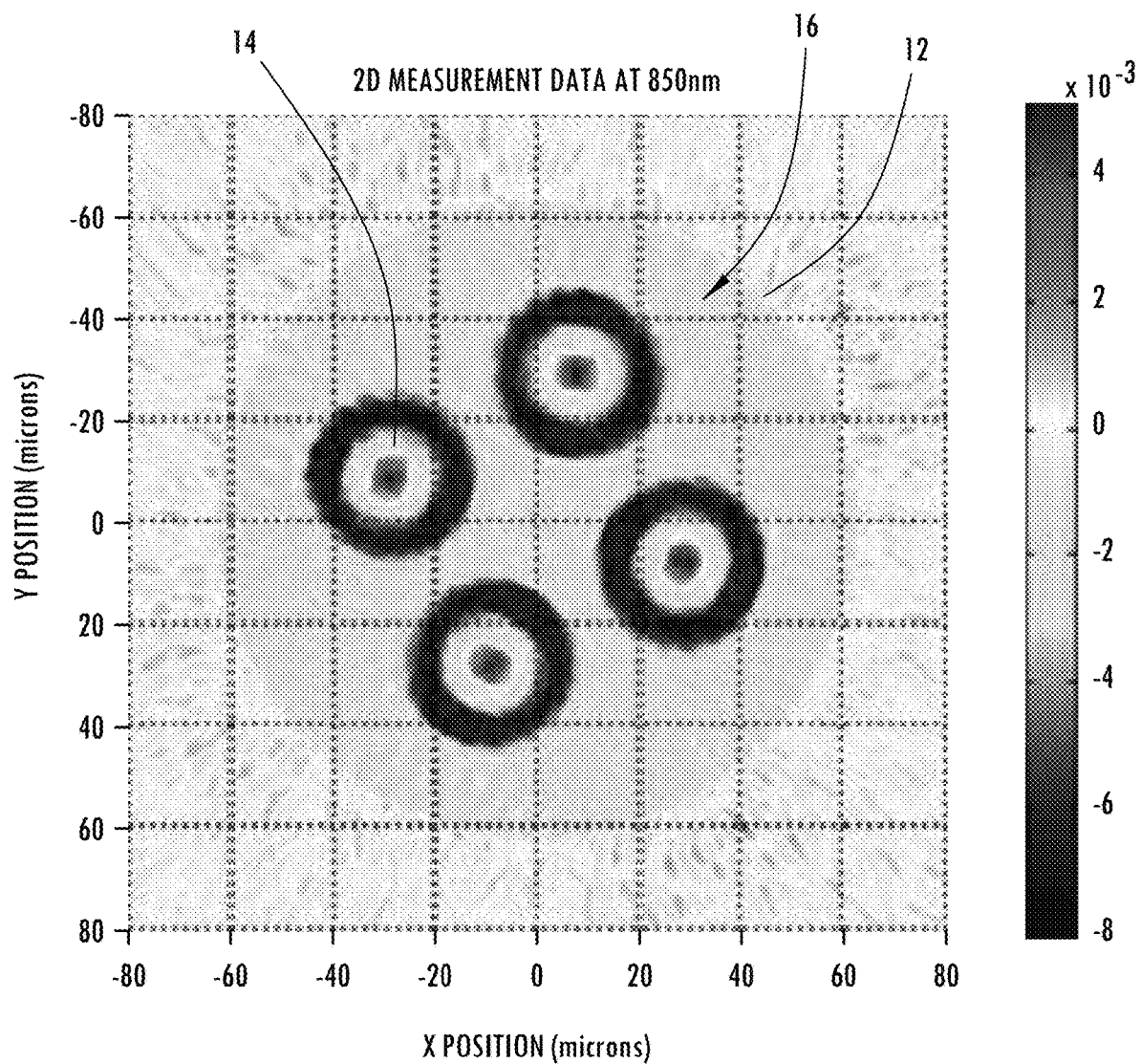
FIG. 5 is a refractive index profile of a multicore optical fiber having four core regions wherein the refractive index of each core region is given by the refractive index design profile shown in FIG. 4.

One example of a multicore optical fiber 10 having four core regions 14 arranged in a 2×2 array, as shown in FIGS. 1 and 2, is shown in FIG. 5 having a refractive index design profile as seen in FIG. 4. In this example, each core region 14 is shown having a radius $r_3$ extending from 0 to about 16 microns and an outer cladding extending from about 16 microns to 20 microns embedded in a common cladding. For all examples disclosed herein, radial positions within a core region 14 are defined with respect to the centerline of the core region. That is, the zero of radial position corresponds to the centerline (or cross-sectional center) of each core region and radial position within each core region is defined with respect to its centerline. The core region 14 has a refractive index profile that includes a germania-doped silica core having a radius $r_1$ of about 4.2 microns, an inner cladding extending from a radius of about 4.5 microns to a radius $r_2$ of about 9.0 microns and a fluorine-doped silica trench extending from a radius of about 9 microns to a radius $r_3$ of about 16 microns. The trench shown in this example is a generally square-trench having a rectangular trench profile. The trench volume of the trench in the core region is greater than 50% Δ microns². FIG. 5 shows two-dimensional measurement data of a particular cross-section at a wavelength of 850 nm for the multicore optical fiber 10 of this example. In this example, the marker is not shown and three samples of the multicore optical fiber 10 were measured at three different fiber lengths, labeled Samples 1-3, shown in Table 5 below.

TABLE 5

|  |  | Sample 1<br>2664 | Sample 2<br>5591 | Sample 3<br>7706 |
|---|---|---|---|---|
|  | Length(m) |  |  |  |
| Cut-off Wavelength (nm) | Core 1 | 1169 | 1138 | 1167 |
|  | Core 2 | 1170 | 1155 | 1147 |
|  | Core 3 | 1185 | 1157 | 1161 |
|  | Core 4 | 1171 | 1154 | 1158 |
| MFD 1310 nm (microns) | Core 1 | 8.27 | 8.37 | 9.31 |
|  | Core 2 | 8.40 | 8.35 | 8.41 |
|  | Core 3 | 8.23 | 8.35 | 8.49 |
|  | Core 4 | 8.74 | 8.72 | 8.45 |
| MFD 1550 nm (microns) | Core 1 | 9.29 | 9.43 | 9.56 |
|  | Core 2 | 9.43 | 9.62 | 9.59 |
|  | Core 3 | 9.35 | 9.49 | 9.47 |
|  | Core 4 | 9.57 | 9.84 | 9.55 |
| Spectral Attenuation (dB/km) at 1550 nm | Core 1 | 0.184 | 0.188 | 0.185 |
|  | Core 2 | 0.203 | 0.160 | 0.192 |
|  | Core 3 | 0.190 | 0.189 | 0.191 |
|  | Core 4 | 0.247 | 0.172 | 0.194 |
| OTDR at 1310 nm | Core 1 | 0.339 | 0.336 | 0.334 |
|  | Core 2 | 0.328 | 0.333 | 0.333 |
|  | Core 3 | 0.338 | 0.338 | 0.335 |
|  | Core 4 | 0.333 | 0.333 | 0.334 |
| OTDR at 1550 nm | Core 1 | 0.196 | 0.196 | 0.194 |
|  | Core 2 | 0.204 | 0.190 | 0.195 |
|  | Core 3 | 0.195 | 0.198 | 0.192 |
|  | Core 4 | 0.197 | 0.193 | 0.193 |
| PMD (ps/nm/km) 1550 nm | Core 1 | 0.146 | 0.095 | 0.095 |
|  | Core 2 | 0.157 | 0.101 | 0.084 |
|  | Core 3 | 0.192 | 0.101 | 0.081 |
|  | Core 4 | 0.138 | 0.11 | 0.087 |
| Lambda Zero (nm) | Core 1 | 1326.0 | 1330.3 | 1322.5 |
|  | Core 2 | 1328.6 | 1324.2 | 1320.5 |
|  | Core 3 | 1327.3 | 1322.0 | 1322.8 |
|  | Core 4 | 1330.3 | 1324.2 | 1320.7 |
| Slope (ps/nm/km) | Core 1 | 0.086 | 0.086 | 0.086 |
|  | Core 2 | 0.086 | 0.086 | 0.087 |
|  | Core 3 | 0.085 | 0.086 | 0.086 |
|  | Core 4 | 0.086 | 0.086 | 0.087 |

In Table 5, the optical properties of the 2×2 (four) arrangement of core regions of an exemplary multicore optical fiber 10, with each core region having the refractive index design profile as seen in FIG. 4, are illustrated. Sample 1 has a length of 2664 meters, Sample 2 has a length of 5591 meters, and Sample 3 has a length of 7706 meters. The cable cut-off wavelength for each of the four core regions, the mode field diameter (MFD) at 1310 and the MFD at 1550 nm were measured for each of the four individual core regions, labeled core 1, core 2, core 3 and core 4. The spectral attenuation in dB/km at a wavelength of 1310 nm, optical time domain reflectometer (OTDR) and polarization mode dispersion (PMD) (ps/nm/km) were measured at various wavelengths including 1310 nm and 1550 nm. The zero dispersion wavelength referred to as Lambda Zero (nm) and the polarization mode dispersion (PMD) slope (ps/nm/km) at a wavelength of 1550 nm for each of the four core regions were also measured. Cross-talk measurements on the four core regions of the multicore optical fiber 10 at wavelengths of 1310 nm and 1550 nm with each core region having a refractive index design profile as seen in FIG. 4 were measured and are shown below in Table 6.

TABLE 6

|  | Core 1 | Core 2 | Core 3 | Core 4 | Total (dB) | Total (dB/km) |
|---|---|---|---|---|---|---|
| 1310 nm |  |  |  |  |  |  |
| Core 1 | −0.43 | −64.58 | −69.65 | −61.56 | −59.38 | −66.85 |
| Core 2 | −67.58 | 0.38 | −60.34 | −71.06 | −59.29 | −66.76 |
| Core 3 | −73.52 | −65.98 | 0.15 | −66.64 | −62.89 | −70.37 |
| Core 4 | −65.29 | −71.65 | −65.35 | −0.09 | −61.83 | −69.30 |
|  |  |  |  | Max all Cores | −59.29 | −66.76 |
| 1550 nm |  |  |  |  |  |  |
| Core 1 | −2.07 | −56.86 | −70.99 | −57.76 | −54.18 | −61.66 |
| Core 2 | −57.17 | −1.29 | −57.30 | −70.32 | −54.12 | −61.59 |
| Core 3 | −72.17 | −56.11 | −1.82 | −57.97 | −53.87 | −61.34 |
| Core 4 | −59.24 | −69.27 | −58.40 | −1.71 | −55.60 | −63.08 |
|  |  |  |  | Max all Cores | −53.87 | −61.34 |

As seen in Table 6, the cross-talk measurements on the four core regions at 1310 nm and 1550 nm for the multicore optical fiber with each core-portion having the refractive index design profile shown in sample 2 in Table 5 and FIG. 4 are listed. The cross-talk measurements for each of the cores 1-4 demonstrate low cross-talk performance. This is due in part to the core region spacing and the trench which confines the light and shields it from interference and from leaking into the cladding.

Examples 2-4

Figure 6:
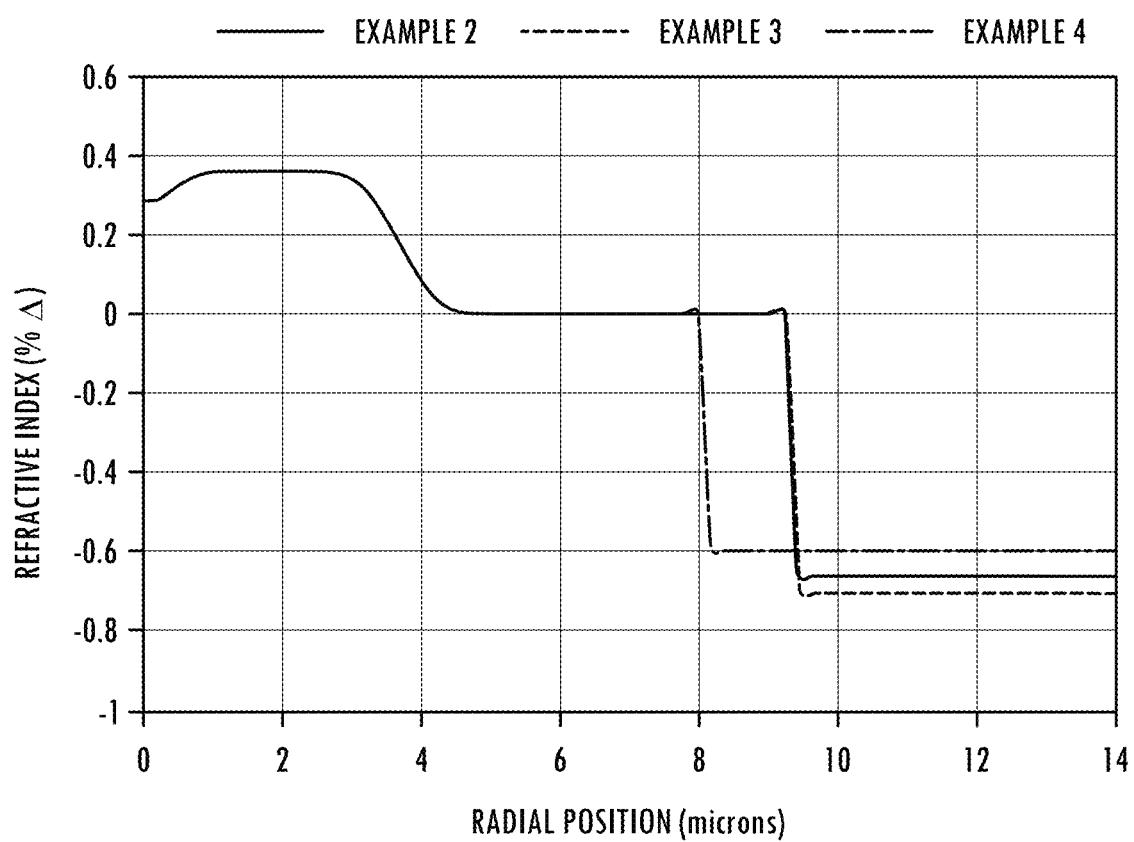
FIG. 6 is a graph illustrating the refractive index design profile of each of the four core regions of the multicore optical fiber in FIGS. 1 and 2, according to Examples 2-4.

Relative refractive index design profiles of three examples 2-4 of the multicore optical fiber having exemplary trench assisted core regions, an MFD at a wavelength of 1310 nm of greater than 8.5 microns and trench volumes greater than 60% Δ microns² are shown in FIG. 6. In each of examples 2-4, the refractive index design profile reflects a generally rectangular trench formed in the core region. In example 2, the trench is formed at a radius of about 9.5 microns to 14 microns. In example 3, the trench is likewise formed at a radius of approximately 9.5 microns to 14 microns and extends deeper than in example 2. In example 4, the trench is formed at about 8 microns to 14 microns and is shallower than the trenches formed in examples 2 and 3. Each fiber had a common outer cladding surrounding the core regions. Various parameters of the multicore optical fibers shown in examples 2-4 are listed in Table 7 below.

TABLE 7

| Opticals | Example 2 | Example 3 | Example 4 |
|---|---|---|---|
| MFD at 1310 nm (microns) | 8.64 | 8.61 | 8.5 |
| MFD at 1550 nm (microns) | 9.72 | 9.71 | 9.42 |
| Cable Cutoff Wavelength (nm) | 1220 | 1216 | 1220 |
| Zero Dispersion Wavelength (nm) | 1319 | 1321 | 1311 |

As can be seen in Table 7 above, the trench assisted core region designs of the multicore optical fibers having an MFD at 1310 nm of greater than 8.5 microns and a trench volume greater than 60% Δ microns² are illustrated.

Examples 5 and 6

Figure 7:
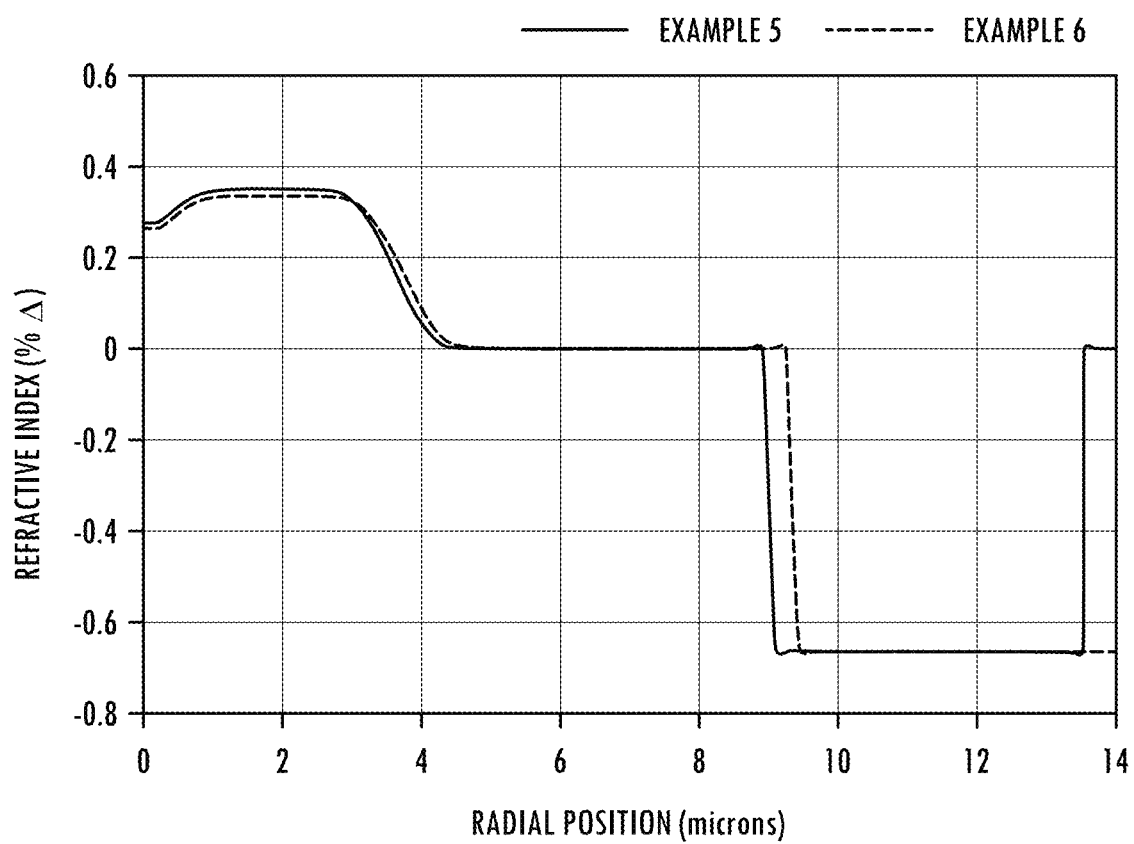
FIG. 7 is a graph illustrating the refractive index design profile of each of the four core regions of the multicore optical fiber shown in FIGS. 1 and 2, according to Examples 5 and 6.
Figure 11:
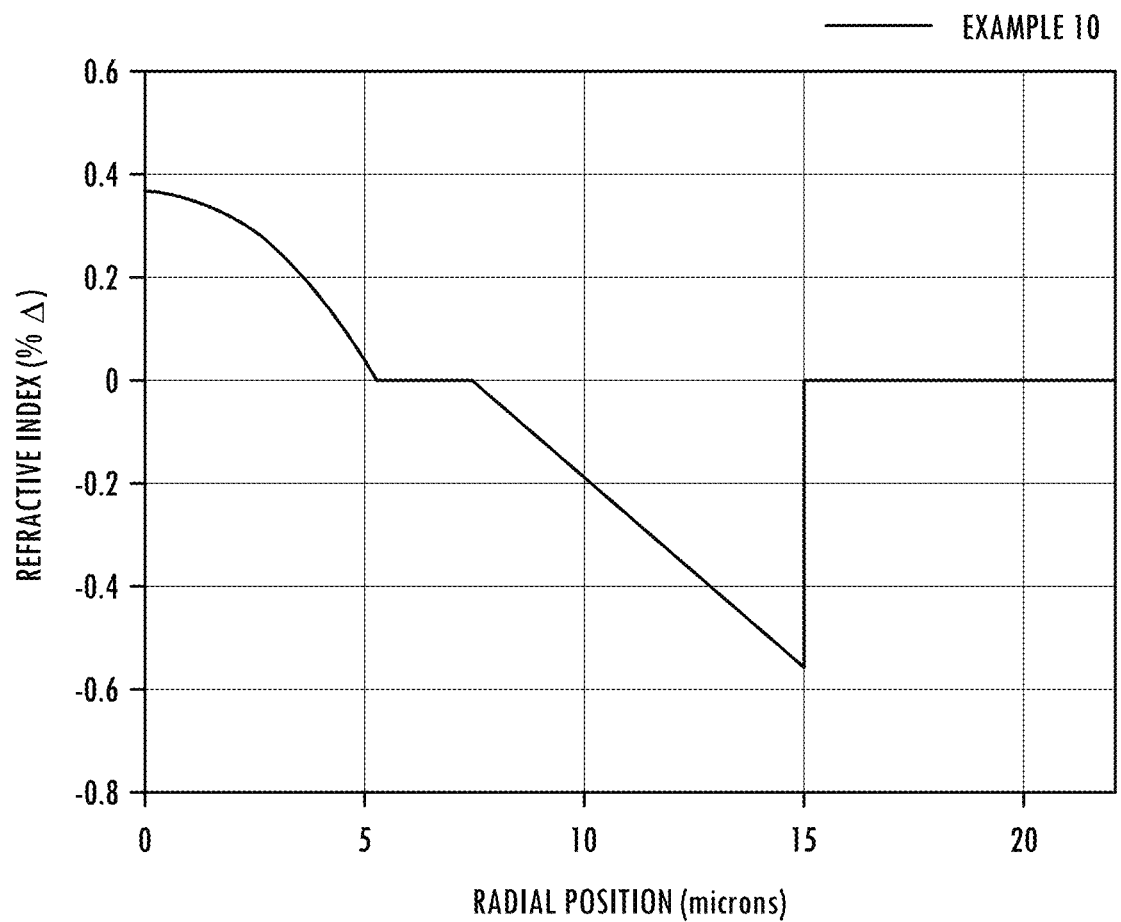
FIG. 11 is a graph illustrating the refractive index design profile of a multicore optical fiber having a graded index alpha core region and a triangular trench design, according to Example 10.

Referring to FIG. 7, the refractive index design profile for trench assisted core regions in multicore optical fibers having an MFD at 1310 nm of greater than 8.5 microns, and trench volumes greater than 60% Δ microns² are shown according to examples 5 and 6. In example 5, a generally rectangular trench is formed in the core region. In example 5, the trench is shown by a depressed region dropping around a radius of about 8.7 microns to about 13.5 microns in a generally rectangular pattern. In example 6, the trench is formed at a radius of about 9.2 microns to about 14 microns to about 16 microns. In FIG. 11, a relative refractive index design profile is shown with a graded index alpha core region and a triangular trench design extending on a decreasing ramp from a radius of about 7.5 microns to about 15 microns in example 10. Optical fiber design and optical properties of the fibers disclosed in each of examples 7-10 were calculated and are listed in Table 9 below.

TABLE 9

|  | Example 7 | Example 8 | Example 9 | Example 10 |
|---|---|---|---|---|
| Maximum Core Index, $\Delta_{1max}$ (%) | 0.336 | 0.37 | 0.336 | 0.37 |
| Core Radius, $r_1$, microns | 4.2 | 5.3 | 4.2 | 5.3 |
| Core alpha | 12 | 2.2 | 12 | 2.2 |
| First Inner Cladding Index, $\Delta_2$ (%) | 0 | 0 | 0 | 0 |
| Trench Inner Radius, $r_2$ (microns) | 9.14 | 10.56 | 7.16 | 7.45 |
| Trench Shape | Rectangular | Rectangular | Triangular | Triangular |
| Trench Minimum Index, $\Delta_{3,\,min}$ (%) | −0.45 | −0.5 | −0.5 | −0.55 |
| Trench Outer Radius, $r_3$ (micron) | 14.2 | 14.6 | 15.9 | 14.9 |
| Volume of Trench Region, $V_3$, %Δ micron² | −53.14 | −50.82 | −56.9 | −50.94 |
| Common Outer Cladding Index, $\Delta_c$ (%) | 0 | 0 | 0 | 0 |
| Mode Field Diameter (micron) at 1310 nm | 9.07 | 9.26 | 9.1 | 9.1 |
| Effective Area at 1310 nm (micron²) | 64.5 | 65.29 | 64.5 | 62.4 |
| Zero Dispersion Wavelength (nm) | 1310 | 1318 | 1314 | 1319 |
| Dispersion at 1310 nm (ps/nm/km) | 0 | −0.736 | −0.36 | −0.837 |
| Dispersion Slope at 1310 nm (ps/nm²/km) | 0.092 | 0.092 | 0.090 | 0.093 |
| Mode Field Diameter (micron) at 1550 nm | 10.14 | 10.45 | 10.21 | 10.22 |
| Effective Area at 1550 nm (micron²) | 79.16 | 82.43 | 79.78 | 78.69 |
| Dispersion at 1550 nm (ps/nm/km) | 19.03 | 18.35 | 18.32 | 18.27 |
| Dispersion Slope at 1550 nm (ps/nm²/km) | 0.066 | 0.066 | 0.064 | 0.065 |
| Cable Cutoff Wavelength (nm) | 1215 | 1200 | 1226 | 1204 |
| Bend Loss for 15 mm mandrel diameter at 1550 nm (dB/turn) | 0.118 | 0.138 | 0.093 | 0.123 |
| Bend Loss for 20 mm mandrel diameter at 1550 nm (dB/turn) | 0.04 | 0.082 | 0.023 | 0.113 |
| Bend Loss for 30 mm mandrel diameter at 1550 nm (dB/turn) | 0.0063 | 0.012 | 0.0025 | 0.004 | microns. The common outer cladding extends beyond the radius of about 14 microns. Various parameters were taken for the exemplary trench assisted core region designs in examples 5 and 6 and are shown in Table 8 below.

TABLE 8

| Opticals | Example 5 | Example 6 |
|---|---|---|
| MFD at 1310 nm (microns) | 8.53 | 8.76 |
| MFD at 1550 nm (microns) | 9.62 | 9.85 |
| Cable Cutoff Wavelength (nm) | 1165 | 1195 |
| Zero Dispersion Wavelength (nm) | 1320 | 1320 |
| Bend at 10 mm Diameter, dB/turn | 0.207 | 0.16 |
| Bend at 15 mm Diameter, dB/turn | 0.053 | 0.042 |
| Bend at 20 mm diameter, dB/turn | 0.014 | 0.011 |
| Bend at 30 mm diameter, dB/turn | 0.003 | 0.003 |

As can be seen in Table 8, the examples 5 and 6 trench assisted core region designs and multicore optical fiber has an MFD at 1310 nm greater than 8.5 microns and trench volumes greater than 60% Δ microns² are shown.

Examples 7-11

Figure 8:
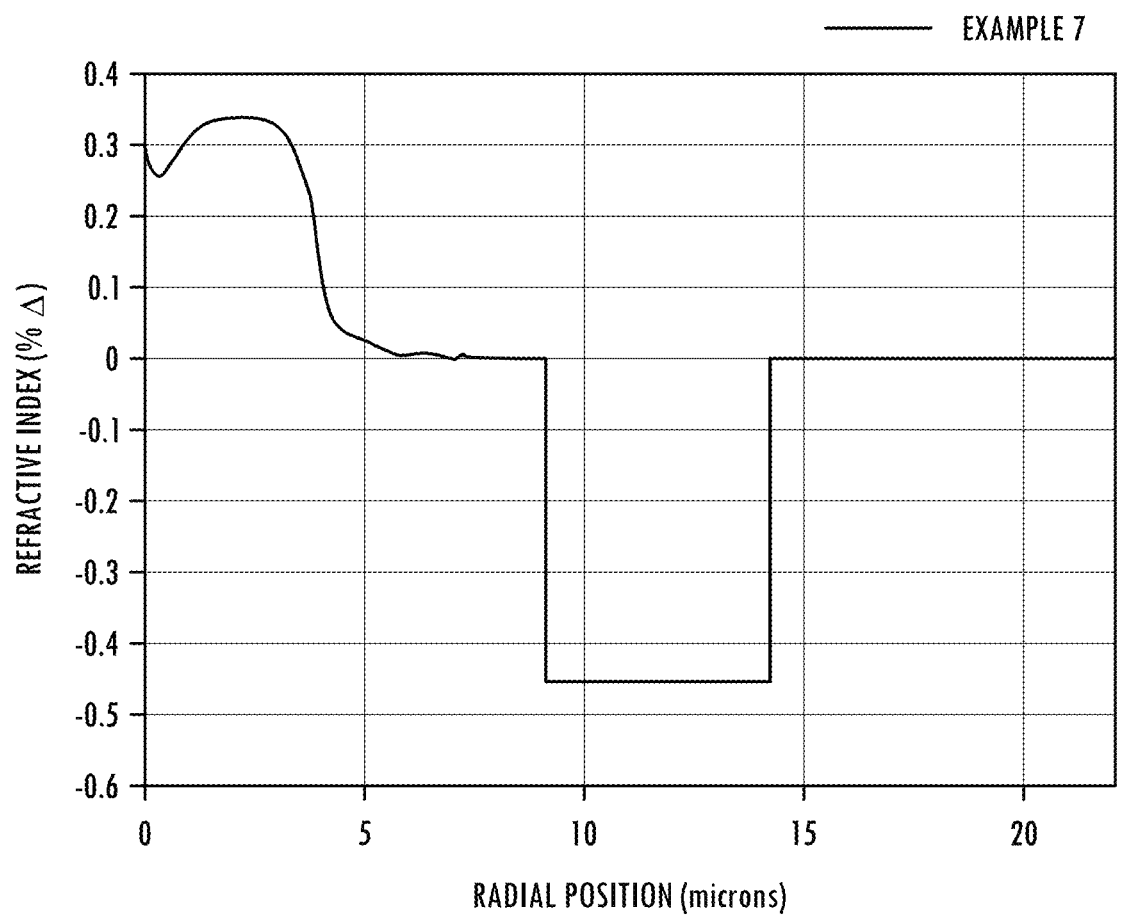
FIG. 8 is a graph illustrating the refractive index design profile of each of the core regions of a multicore optical fiber having a high alpha core region and a rectangular trench design, according to Example 7.
Figure 9:
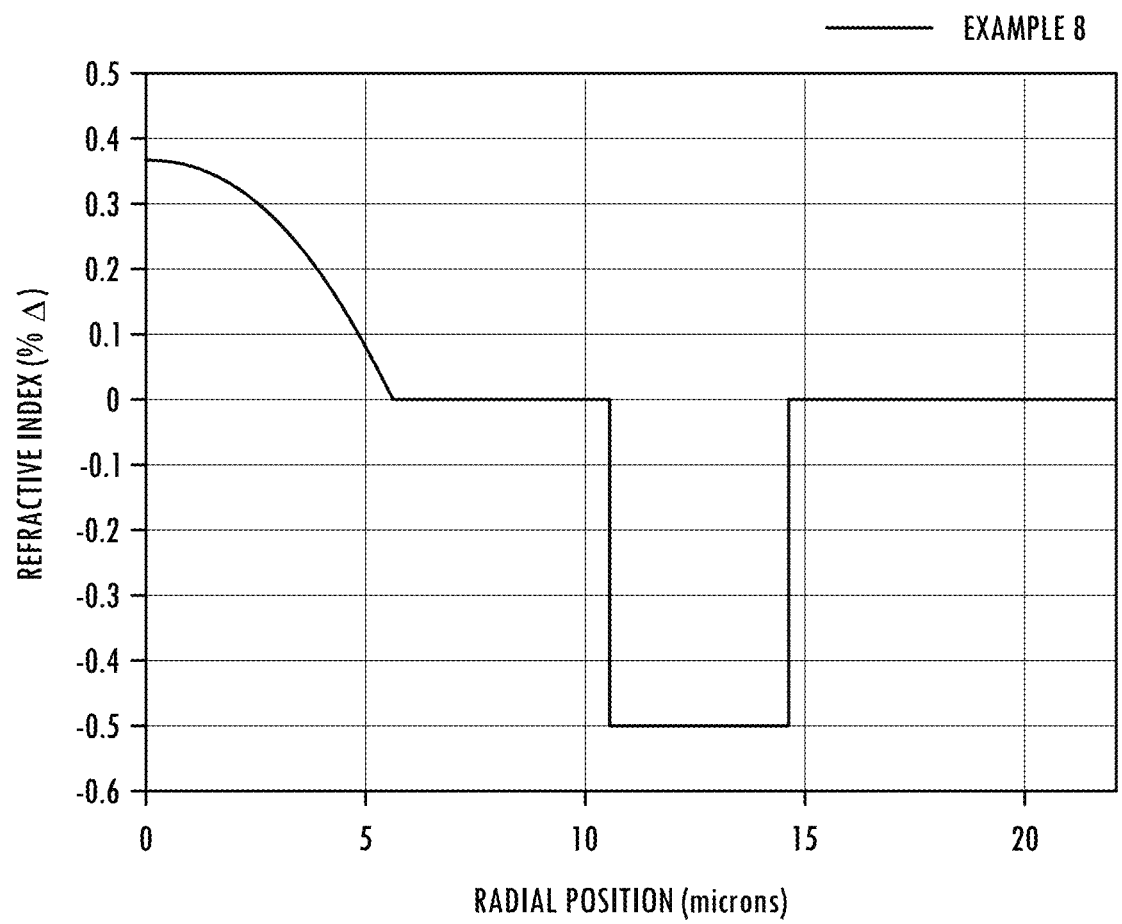
FIG. 9 is a graph illustrating the refractive index design profile of each of the core regions of a multicore optical fiber having a graded index alpha core region and a rectangular trench design, according to Example 8.
Figure 10:
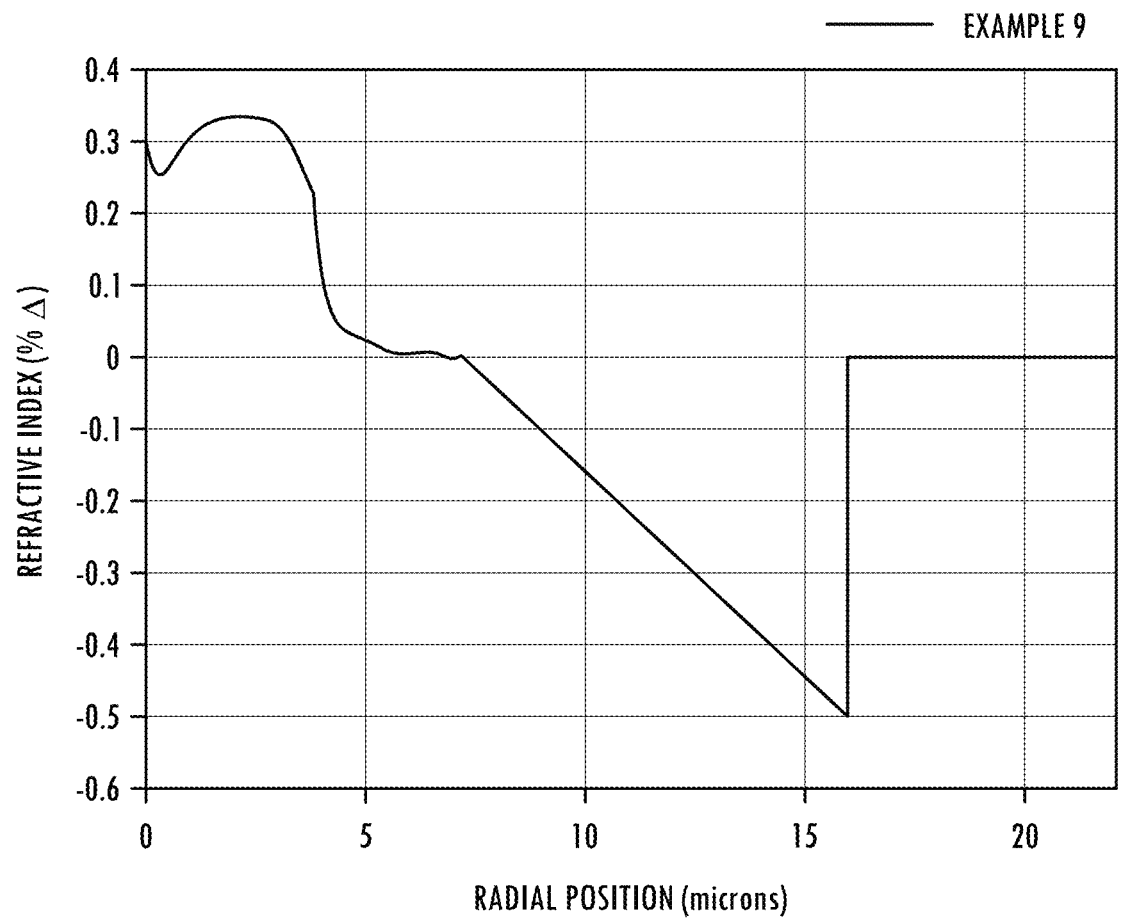
FIG. 10 is a graph illustrating the refractive index design profile of each of the core regions of a multicore optical fiber having a high alpha core region and a triangular trench design, according to Example 9.

Referring to FIG. 8, a multicore optical fiber relative refractive index design profile is shown, according to example 7, having a high alpha core region and rectangular trench design extending from a radius of about 9 microns to 14 microns. In FIG. 9, the relative refractive index design profile for example 8 has a graded index alpha core region and a rectangular trench design extending from a radius of about 10.5 microns to about 14.5 microns. In FIG. 10, the relative refractive index design profile for example 9 has a high alpha core region and a triangular trench design. The triangular trench design shows the trench formed along a ramped angle line that decreases from a radius of about 7

The optical fiber design and optical properties of the multicore optical fiber disclosed in examples 7-10 are shown in Table 9.

Various modifications and alterations may be made to the examples within the scope of the claims, and aspects of the different examples may be combined in different ways to achieve further examples. Accordingly, the true scope of the claims is to be understood from the entirety of the present disclosure in view of, but not limited to, the embodiments described herein.

It will be apparent to those skilled in the art that various modifications and variations can be made without departing from the spirit or scope of the claims.

What is claimed is:
1. A multicore optical fiber comprising:
    an inner glass region having a plurality of core regions surrounded by a common outer cladding, the inner glass region further having at least one marker and an outer diameter in the range of 120 microns and 130 microns, wherein each core region is comprised of a germania-doped silica core and a fluorine-doped silica trench, wherein a trench volume of the fluorine-doped silica trench is greater than 50% Δ microns²; and
    an outer coating layer surrounding the inner glass region, wherein the outer coating layer comprises a primary coating layer and a secondary coating layer surrounding the primary coating layer, and wherein a ratio of a secondary coating layer thickness to a primary coating layer thickness is in a range of 0.65 to 1.0, the outer coating layer having a diameter equal to or less than 200 microns, wherein each core region has a mode field diameter greater than 8.2 microns at 1310 nm, a cable cutoff wavelength of less than 1260 nm, and a zero dispersion wavelength of less than 1335 nm.

2. The multicore optical fiber of claim 1, wherein the diameter of the outer coating layer is equal to or less than 190 microns.

3. The multicore optical fiber of claim 1, wherein the primary coating layer has an elastic Young's modulus of less than 1 MPa and $T_g$ of less than −20° C., and the secondary coating layer has a Young's modulus of greater than 1500 MPa and $T_g$ of greater than 65° C.

4. The multicore optical fiber of claim 3, wherein a puncture resistance of the secondary coating layer is greater than 25 g.

5. The multicore optical fiber of claim 1, wherein the trench volume in each core region is greater than 60% $\Delta$ microns$^2$.

6. The multicore optical fiber of claim 1, wherein the marker in the glass region is located at a position to mark a particular one of the plurality of core regions.

7. The multicore optical fiber of claim 1, wherein the marker is comprised of a fluorine-doped silica glass.

8. The multicore optical fiber of claim 1, wherein a distance between centers of any two of the plurality of core regions is greater than 35 microns.

9. The multicore optical fiber of claim 1, wherein a distance between centers of any two of the plurality of core regions is greater than 40 microns.

10. The multicore optical fiber of claim 1, wherein a distance between a center of each of the plurality of core regions to any point of outermost edge of the inner glass region is greater than 30 microns.

11. The multicore optical fiber of claim 1, wherein an outer radius of each of the plurality of core regions is greater than 11 microns.

12. The multicore optical fiber of claim 1, wherein an outer radius of each of the plurality of core regions is greater than 13 microns.

13. The multicore optical fiber of claim 1, wherein a cross-talk between any two of the plurality of core regions is less than −30 dB/100 km at 1310 nm.

14. The multicore optical fiber of claim 1, wherein a cross-talk between any two of the plurality of core regions is less than −50 dB/100 km at 1310 nm.

15. The multicore optical fiber of claim 1, wherein a cross-talk between any two of the plurality of core regions is less than −60 dB/100 km at 1310 nm.

16. The multicore optical fiber of claim 1, wherein a spectral loss of each of the plurality of core regions is less than 0.34 dB/km at 1330 nm and less than 0.2 dB/km at 1550 nm.

17. The multicore optical fiber of claim 1, wherein the outer coating layer further comprises a tertiary coating layer surrounding the secondary coating layer, the tertiary coating layer having a thickness of equal to or less than 10 microns.

18. The multicore optical fiber of claim 1, wherein the outer coating layer further comprises a tertiary coating layer surrounding the secondary coating layer, the tertiary coating layer having a thickness of equal to or less than 5 microns.

19. The multicore optical fiber of claim 1, wherein the plurality of core regions comprises at least four core regions.

20. A multicore optical fiber comprising:
an inner glass region having a plurality of core regions surrounded by a common outer cladding, the inner glass region further having at least one marker and an outer diameter in the range of 120 microns and 130 microns, wherein each core region has an outer radius greater than 11 microns and is comprised of a germania-doped silica core region, an inner cladding and a fluorine-doped silica trench, wherein a trench volume of the fluorine-doped silica trench is greater than 50% $\Delta$ microns$^2$; and
an outer coating layer surrounding the inner glass region, wherein the outer coating layer comprises a primary coating layer and a secondary coating layer surrounding the primary coating layer, and wherein a ratio of a secondary coating layer thickness to a primary coating layer thickness is in a range of 0.65 to 1.0, the outer coating layer having a diameter equal to or less than 200 microns, wherein each core region has a mode field diameter greater than 8.2 microns at 1310 nm, a cable cutoff wavelength of less than 1260 nm, and a zero dispersion wavelength of less than 1335 nm.

* * * * *